United States Patent Office 2,996,013
Patented Aug. 15, 1961

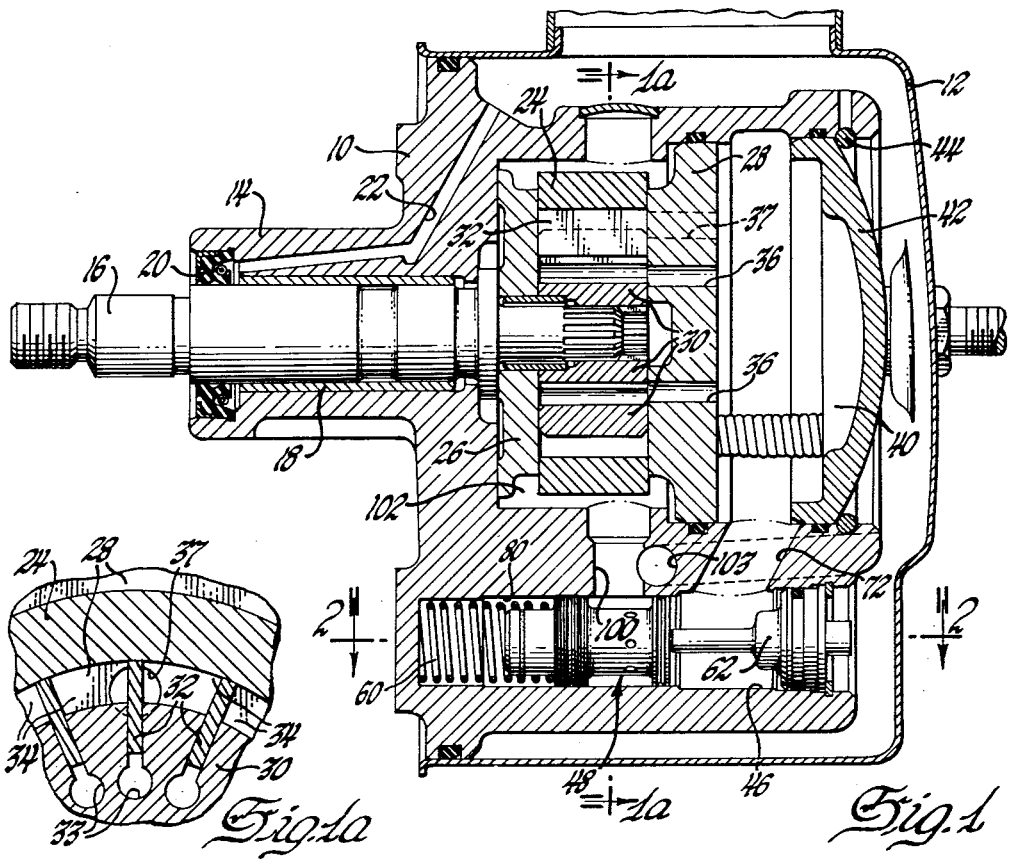

2,996,013
ANTI-SURGE VALVE FOR POWER STEERING PUMP
William Blair Thompson, Newton Center, Mass., and Robert P. Rohde, Saginaw, Mich., assignors to General Motors Corporation, Detroit, Mich., a corporation of Delaware
Filed Sept. 24, 1959, Ser. No. 842,097
2 Claims. (Cl. 103—42)

This invention relates to fluid pressure generating devices or pumps of the type discharging through a flow control orifice and incorporating a bypass valve allowing for the passage of fluid from the discharge side of the device to the intake side thereof when the rate of flow of the discharge fluid exceeds the value set by the orifice.

Pumps of the type indicated are commonly used in the fluid power steering of automotive vehicles to supply the fluid pressure required for operation of the fluid motor or jack by means of which the steering linkage is actuated. In such a system, flow between the pump and motor is under the control of a valve which is actuated manually through the steering shaft or equivalent instrumentality. In the centered or neutral position of the valve, corresponding the the straight-ahead position of the dirigible wheels, fluid from the pump circulates through the valve and back to the pump (or the reservoir from which the pump draws) against the static pressure of the fluid in the fluid motor.

Normally, the pump is driven by the engine of the vehicle, the drive shaft of the pump being belted to the engine crankshaft. The pump thus operates at all times when the vehicle engine is running and the speed of operation of the pump is directly proportional to the engine speed. To prevent the heat build-up in the fluid system which would otherwise occur at high engine speeds as a consequence of high back pressures in the pump discharge conduit caused by the narrowness of the control valve gaps, there is incorporated in the pump a bypass valve which functions to interconnect the pump discharge and intake chambers whenever the output of the pump is in excess of that able to pass an orifice contained in the discharge conduit and having a diameter gauged to provide only sufficient flow to the power steering mechanism to insure its proper operation under conditions of low engine speed and maximum pressure demand, as obtains during parking or maneuvering in close quarters. The bypass valve is made responsive to the pressure of the discharge fluid upstream of the orifice and becomes displaced to its open position on the occurrence of a pressure drop across the orifice.

Apart from the foregoing, it has been found advantageous to incorporate in the pump structure means for supercharging the pump intake chamber. This is commonly done by making the bypass passage to a smaller diameter than the passage ahead of the bypass valve so as to work an increase in the velocity of the fluid in the bypass passage. Under Bennoulli's principle, this increased velocity translates into increased static pressure in the intake chamber, making for more complete filling of the pumping chambers and lessening the likelihood of cavitation.

In the operation of power steering systems including a pump as above described, it has been observed that pressure surges in the conduit between the pump and the power steering control valve caused by momentary displacements of such valve by road forces as ruts, rocks, etc., result in opening of the bypass valve to a greater extent than normal and that the consequent increase in the size of the bypass passage spells out in loss of supercharging effect, reflected as a pressure lag noticeable by the operator at the steering wheel.

The present invention has as a principal object to provide means precluding the occurrence of such a pressure lag.

Other objects and features of the invention will be apparent from the following description which will proceed with reference to the accompanying drawings wherein:

FIGURE 1 is a section through a power steering pump of a type to which the invention is applicable;
FIGURE 1a is a framentary section taken on the line 1a—1a in FIGURE 1; and
FIGURE 2 is a section on the line 2—2 in FIGURE 1.

As shown in FIGURE 1, the pump body 10 is partly encased within a reservoir 12. A portion of the pump body is formed as a boss 14 to properly journal a drive shaft 16 turning in a bushing 18. Fluid passing the bushing 18 is prevented from leaking from the pump body by a seal 20 accommodated in an annular recess in the boss 14. Such recess has communication with the reservoir 12 via a passage 22. Thus fluid passing the bushing is returned to the reservoir.

Within the pump body is housed a cam ring 24 disposed between a thrust plate 26 and a pressure plate 28. These plates and the other parts of the pump are described in detail in co-pending application Serial No. 762,162, filed September 15, 1958 in the names of Robert P. Rohde, William B. Thompson and Philip B. Zeigler. Suffice it to say here, that there is carried on the drive shaft 16 within the cam ring 24 a rotor 30 carrying a plurality of vanes 32 (see FIGURE 1a) delineating a plurality of pumping chambers 34. In operation, the vanes 32, which are pressure loaded by discharge fluid in pockets 33, this fluid being supplied via passages 36 in plate 28, are reciprocated radially as they rotate with the drive shaft, providing the pumping action. The pumping chambers discharge through passages 37 in the pressure plate 28 to a pressure chamber 40 delineated by the pump body and a closure member 42 secured in place by a snap ring 44.

A bore 46 in the pump body contains a bypass valve 48 which itself confines a relief valve 50 biased by a spring 52 and seating on a seat provided by a plug 54 threaded into the bypass valve. The latter is urged rightwardly by a spring 60 toward the stem of a plug 62 having a flange 63 by means of which the plug is located. A snap ring 64 retains the flange in abutting engagement with an annular shoulder 65. As clearly appears in FIGURE 1, the end face 70 of the valve 48 is at all times exposed to fluid at discharge pressure, chamber 40 and bore 46 having communication via a passage 72.

A bypass passage 100, with valve 48 open, allows for flow of fluid from pressure chamber 40 to the pump intake chamber 102. Passage 103 opens to the reservoir 12, make-up fluid thus being supplied to the pump with the bypass fluid.

Going now to FIGURE 2, it will be observed that bore 46 has communication with a second bore 74 via a passage including an orifice 76. This orifice 76 is the flow control orifice previously hereinbefore mentioned, while bore 74 constitutes a continuance of the discharge conduit to the system served by the pump. A fixture 78 is adapted for connection to a pressure hose, not shown, extending to the power steering control valve.

There will be seen disposed partly within the bore 74 an auxiliary valve 86 comprising a housing 88 and a ball element 90 biased rightwardly by a spring 92. Housing 88 has threaded connection with the pump body 10 and has therein an aperture 96 and an orifice 98. As clearly appears, the auxiliary valve 86 is located at the end of a drilled passage 84 which is open to a drilled passage 82, in turn open to the chamber 80 within which the spring 60 is confined. Passage 84 is somewhat restricted at 84a to gain a damping effect.

To describe the operation of the pump, let it be assumed that the drive shaft 16 is rotating at a slow rate corresponding to a vehicle engine speed of idle or slightly faster, as obtains during parking. Under these conditions, the entire output of the pump passes through the orifice 76 and the bore 74 to the system, bypass valve 48 remaining in its shown position preventing flow into the passage 100. Now upon speeding-up of the vehicle engine and, consequently, of the drive shaft 16, a pressure drop develops across the orifice 76 with the result that the bypass valve 48 is displaced against the resistance of the spring 60 and the fluid contained in the chamber 80 to allow for passage of the excess discharge fluid into the intake chamber 102 via the passage 100, where the fluid develops a supercharging velocity due to passage 100 being of lesser diameter than passage 72.

The fluid in the chamber 80 against the resistance of which valve 48 is displaced is derived from the bore 74. The same may enter the chamber 80 via the route of the orifice 98 or via the route of both such orifice and the aperture 96, depending on whether the pressure differential existing between bore 74 and chamber 80 is sufficient to result in displacement of the ball 90 against the resistance of the associated spring 92.

Let it be assumed now that the vehicle is coursing a rutted or rocky road which, as explained hereinbefore, may cause quick, sequential widening and restriction of the power steering control valve gaps, creating pressure surges in the bore 74 and the pressure chamber 40. Due to the auxiliary valve 86, however, these pressure surges do not, as heretofore, cause valve 48 to become momentarily displaced leftwardly an extent such that the normal supercharging effect of the bypass passage 100 is lost with creation of a pressure lag in the system. Rather, any abrupt movement of the control valve 48 results in seating of the ball 90 against the resistance of the surge pressure in bore 74 with the result that flow from the chamber 80 to the bore 74 can occur only through the orifice 98. With flow between chamber 80 and bore 74 so restricted, movement of valve 48 is retarded and there is no decrease in the normal velocity of the bypass fluid as it courses passage 100.

Relief valve 50, which forms no part of the present invention, is unaffected in its function by the incorporation of valve 86 in the pump. Thus, any time the system pressure, i.e., the pressure in bore 74 and beyond, attains a value exceeding the setting of the relief valve, ball 50 becomes displaced to vent the chamber 80 to the passageway 100 via the radial passages 53 in the body of the valve 48. Flow of fluid from the system under the indicated condition is, of course, marked by displacement of ball 90 from its seat.

We claim:

1. In association with a constant displacement pump discharging through a conduit having a flow control orifice therein, said pump incorporating a bypass valve actuated by fluid pressure to interconnect the intake and discharge sides of the pump when the output of the pump is such as to cause a pressure differential across said orifice, said bypass valve being biased by yieldable means toward its closed position and having opposed surfaces for fluid reaction, one of said surfaces being exposed at all times to the pressure of the discharge fluid upstream of said orifice, means providing a chamber to which the other of said reaction surfaces is exposed, means providing a passage extending from said chamber and connecting with said conduit downstream of said orifice, valve means in said passage displaceable to permit flow from said conduit to said chamber but incapable of being displaced to permit flow from said chamber to said conduit, and means providing an orifice circumventing said last valve means whereby restricted flow between said chamber and said conduit may occur at all times.

2. In association with a constant displacement pump discharging through a conduit having a flow control orifice therein, said pump incorporating a bypass valve actuated by fluid pressure to interconnect the intake and discharge sides of the pump when the output of the pump is such as to cause a pressure differential across said orifice, said bypass valve being biased by yieldable means toward its closed position and having opposed surfaces for fluid reaction, one of said surfaces being exposed at all times to the pressure of the discharge fluid upstream of said orifice, means providing a chamber to which the other of said reaction surfaces is exposed, means providing a passage extending from said chamber and connecting with said conduit downstream of said orifice, valve means in said passage comprising a housing open to said chamber and a displaceable element within said housing having yieldable means associated therewith urging said element in the direction toward said conduit, said housing providing a seat for said element and having an orifice therein open to that portion of the housing having said yieldable means associated therewith, said element being subject to the pressure of fluid in said conduit and being displaceable thereby to allow fluid to flow from said conduit to said chamber, said last valve means being characterized in operation in that on movement of said bypass valve toward its open position fluid displaced from said chamber by such movement has ingress to said conduit only through the orifice in said housing.

References Cited in the file of this patent
UNITED STATES PATENTS

| | | |
|---|---|---|
| 865,388 | Hill | Sept. 10, 1907 |
| 1,775,613 | Ferris | Sept. 9, 1930 |
| 2,835,201 | Pettibone | May 20, 1958 |
| 2,880,674 | Klessig | Apr. 7, 1959 |